United States Patent [19]

Darr

[11] Patent Number: 4,474,086

[45] Date of Patent: Oct. 2, 1984

[54] SAW BLADE GRINDING DEVICE

[76] Inventor: Farris W. Darr, 2452 Northland, St. Louis, Mo. 63114

[21] Appl. No.: 403,523

[22] Filed: Jul. 30, 1982

[51] Int. Cl.³ .............................................. B23D 63/14
[52] U.S. Cl. ........................................... 76/43; 76/37
[58] Field of Search .................... 76/37, 43, 40, 42, 41

[56] References Cited

U.S. PATENT DOCUMENTS 2,293,231 8/1942 Weiland ................................. 76/43
3,759,118 9/1973 Glas ...................................... 76/43

FOREIGN PATENT DOCUMENTS 517125 2/1931 Fed. Rep. of Germany .......... 76/43
839893 5/1952 Fed. Rep. of Germany .......... 76/43
988732 5/1951 France ................................... 76/43

Primary Examiner—Roscoe V. Parker

[57] ABSTRACT

A saw grinding device which provides a blade securing rotatable platform which mounts on a horizontal surface such as a table disposed beneath an overhead armature saw device wherein the platform is provided with an edge gauge and peripheral stop device.

1 Claim, 5 Drawing Figures

FIG 5
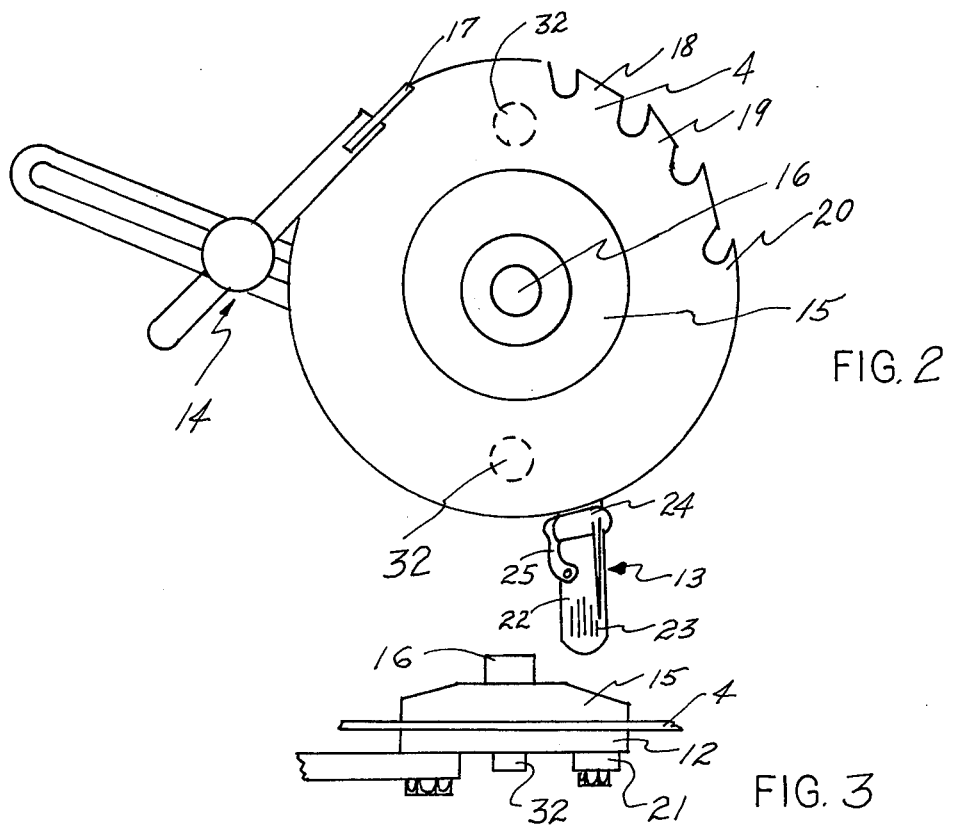
FIG. 2
FIG. 3

SAW BLADE GRINDING DEVICE

BACKGROUND OF THE INVENTION

Conventional techniques for grinding saw blades lack simplicity and versatility and thus are not available in an economical price range affordable to the average hobbyist and small businessman using circular saws on a regular basis.

Typically, previous devices have been devices with elaborate facilities or else have been so simple that the sharpening is not performed in a proficient manner.

SUMMARY

It is therefore an object of the present invention to provide a Saw Blade Grinding Device which includes a rotatable mounting platform provided with a stop device and edge guage.

A further object of the present invention is to provide such a device which is simply and economically manufactured and used.

These, together with other objects and advantages which will become subsequently apparent, reside in the details and construction and operation as more fully hereinafter described and claimed, reference being had to the accompanying drawings forming a part hereof, wherein like numerals refer to like parts throughout, and in which;

BRIEF DESCRIPTION OF THE DRAWINGS

In the drawings:

FIG. 2 is a partial sectional elevation view of the device in FIG. 1.

FIG. 3 is a partial perspective view of the device in FIG. 1.

FIG. 5 is partial view of saw teeth to be ground.

DETAILED DESCRIPTION OF THE INVENTION

Figures 1, 4:
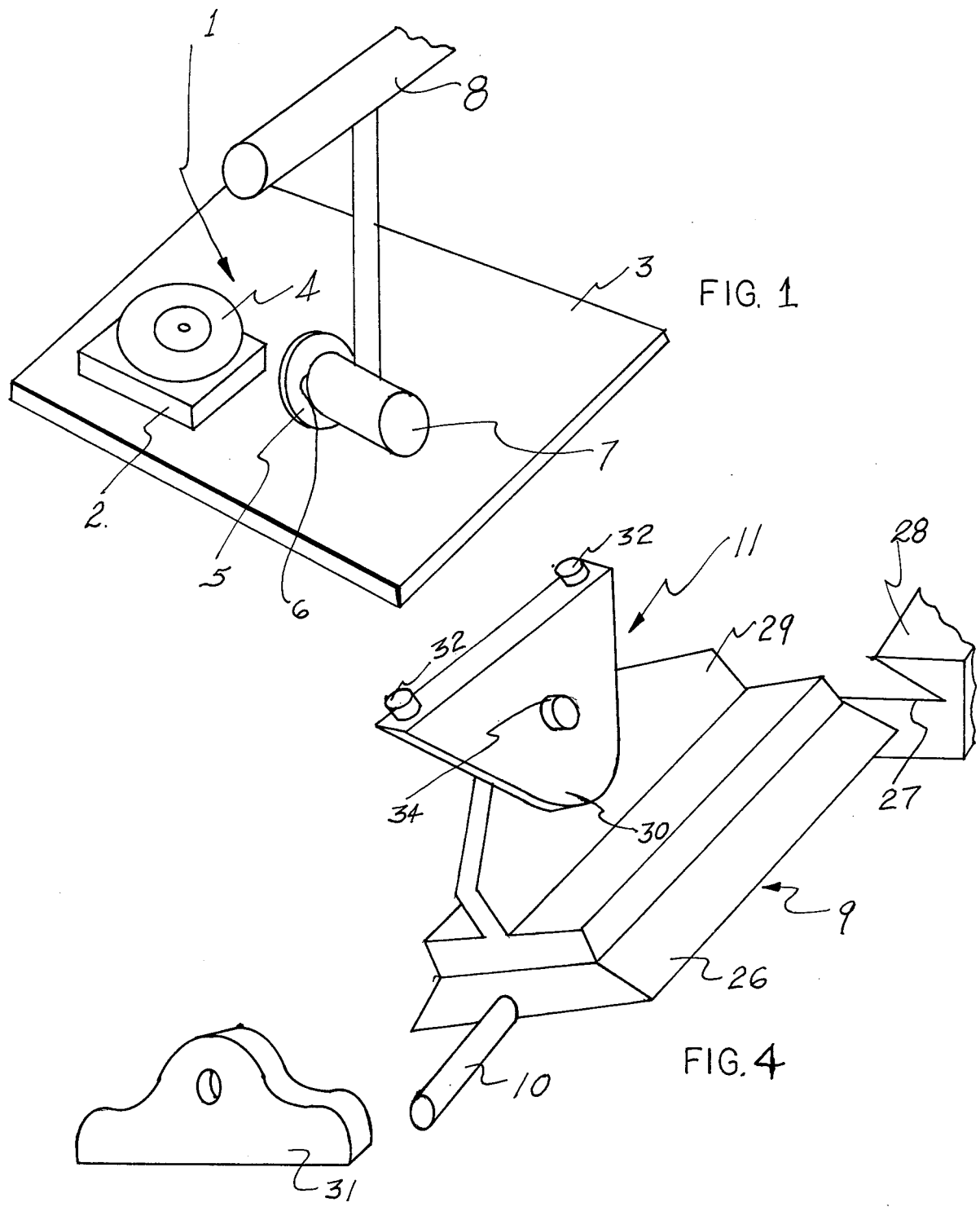
FIG. 1 is a perspective view of a saw blade device constructed in accordance with and embodying the present invention.
FIG. 4 is an exploded perspective view of a portion of the saw blade device shown in FIG. 1.

Referring now in more detail and by reference characters to the drawings which illustrate practical embodiments of the present invention, FIG. 1 is a perspective view of a Saw Blade Grinding Device, 1, constructed in accordance with, used in, and embodying the present invention and shown in greater detail in FIGS. 2, 3, and 4.

As shown in FIG. 1, Saw Blade Grinding Device, 1, comprises mounting platform, 2, which is typically mounted upon a horizontal surface such as table, 3. It is contemplated that circular saw blade, 4, will be sharpened using grinding wheel, 5, mounted on the shaft, 6, of armature of saw motor, 7, which is suspended and travels on arm, 8, in typical fashion.

Mounting platform, 2, includes adjustable cross feed mechanism, 9, provided with crank shaft, 10, which provides translational movement of blade, 4. Also included are tilt means, 11, to tilt blade, 4. Adjustably secured to plate, 12, is an edge guage device, 13, and stop device, 14. Securing blade, 4, to plate, 12, is circular plate, 15. Crank shaft 10 fits in plate 31.

Typical operation of the device would include mounting device, 1, on table, 3. Grinding wheel, 5, is mounted on shaft, 6. Blade, 4, is secured to plate, 12, using plate, 15.

Means, 11, are adjusted to tilt blade, 4, typically plus or minus one degree to thirty degrees measured from the longitudinal axis of shaft, 16. Finger, 17, is then set on tooth, 18, which precedes tooth, 19, being ground. Hand pressure is applied to hold the blade, 4, from turning during grinding. As shown in FIG. 1, the pressure would be applied in a counter-clockwise direction and the grinding wheel travel would be upward and to the right in FIG. 2. After the first tooth, 19, is ground, the blade is rotated to the next tooth, 20, to be ground which would ordinarily be every other tooth since alternate teeth are at plus and minus the tilt angle as shown in FIG. 5. After doing all the teeth, including the opposite tilt, then the device is set for grinding the proper bevel angle on each tooth.

Finger, 17, allows alignment of back clearance.

Edge gauge device, 13, comprises arm, 21, to which is secured guage plate, 22, with indicia, 23, marked thereon in combination with spring-loaded edge member, 24, and securing spring, 25, pivotally mounted on guage plate, 22. Edge member, 24, as shown, rides against the peripheral edge of blade, 4, and as the blade turns the consistency of the radial measurement of blade, 4, is indicated by the amount of angular rotation of guage plate, 22, as registered on the indicia, 23. When edge member, 24, is not in use, it is rotated and captured by securing spring, 25.

Tilt means, 11, is comprised of beveled plate, 26, which rides in slot, 27, in block, 28. Mounted on plate, 26, are pivotal plates, 29, and 30. Tilt of device, 1, is controlled by angularly adjusting the angular relationship of plates, 29, and 30, using screw means 34, while translational movement is controlled by crank shaft 10 which is captured by face plate, 31. Plate 12 is secured to plate 30 by studs 32.

It should be understood that changes and modifications in the form, construction, arrangement, and combination of the Saw Blade Grinding Device and methods of making and using the same may be made and substituted for those herein shown and described without departing from the nature and principle of my invention.

I claim:

1. A saw grinding platform for use with an overhead armature saw, comprising, platform means, said platform means comprising
a base provided with a v-slot therein,
a v-block mounted in said v-slot,
a crank shaft coupled to said v-block to move said v-block and provide translational movement,
a first plate pivotally mounted on said v-block, said pivotal motion about an axis perpendicular to said translational motion,
mounting studs mounted on said first plate,
second and third plates operably mounted on said studs, disposed therebetween is the saw blade to be ground,
an adjustable arm stop operably mounted on said second plate, and
edge measuring means comprising a spring loaded arm mounted on said second plate.

* * * * *